United States Patent [19]

Takaishi et al.

[11] 3,894,101

[45] July 8, 1975

[54] PROCESS FOR THE PREPARATION OF 1-METHYLADAMANTANE

[75] Inventors: Naotake Takaishi; Yoshiaki Inamoto, both of Wakayama; Kiyoshi Tsuchihashi, Kainan, all of Japan

[73] Assignee: Kao Soap Co., Ltd., Tokyo, Japan

[22] Filed: July 2, 1974

[21] Appl. No.: 485,069

[30] Foreign Application Priority Data
July 10, 1973 Japan.................................. 48-77623

[52] U.S. Cl....................... 260/666 M; 260/666 PY
[51] Int. Cl............................................... C07c 5/24
[58] Field of Search.................. 260/666 M, 666 PY

[56] References Cited
UNITED STATES PATENTS
3,356,751  12/1967  Schneider....................... 260/666 M OTHER PUBLICATIONS
Derek J. Cash et al., Tetrahedron Letters, No. 52, pp. 6445–6451, 1966.

Primary Examiner—Veronica O'Keefe
Attorney, Agent, or Firm—Woodhams, Blanchard and Flynn

[57] ABSTRACT

A process for the preparation of 1-methyladamantane by isomerizing tricyclo[5.3.1.0$^{3,8}$]undecane in the presence of acid catalyst.

6 Claims, No Drawings

PROCESS FOR THE PREPARATION OF 1-METHYLADAMANTANE

BACKGROUND OF THE INVENTION

1. Field of the Invention

This invention relates to a process for preparing 1-methyladamantane (II), a known useful compound, in a high yield by a one-step isomerization of tricyclo[5.3.1.0³,⁸]undecane (I), which is a novel tricyclic hydrocarbon. The process is carried out according to the following reaction scheme (1):

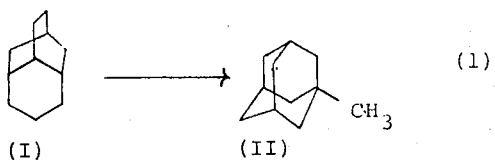

2. Description of the Prior Art

Reports on the isomerization of tricycloundecanes to form 1-methyladamantane (II) have been published by Schleyer, et al., Tetrahedron Letters, 305 (1961); Schneider, et al., U.S. Pat. No. 3,356,751, McKervey, et al., Tetrahedron Letters, 27, 4317 (1971); Petrov, et al., Neftekhimiya, 11, 163 (1971). However, tricyclo[5.3.1.0³,⁸]undecane (I) used in this invention is a novel compound, and its isomerization is not known in the art.

SUMMARY OF THE INVENTION

This invention is based on our discovery that tricyclo[5.3.1.0³,⁸]undecane (I), which is a novel tricyclic hydrocarbon, can be isomerized to 1-methyladamantane (II) with great ease and in a substantially quantitative yield.

The starting material tricyclo[5.3.1.0³,⁸]undecane (I) used in this invention can easily be prepared, for example, by the acid catalyzed isomerization of tetramethylenenorbornane (III), as described in Japanese Patent Application Ser. No. 77621/73, filed July 10, 1973 and the corresponding U.S. Pat. Application Ser. No. 485,068, filed July 2, 1974, being filed concurrently herewith (Attorney's Reference Furuya Case 360) the entire contents of which are incorporated herein by reference, and tricyclo[5.2.2.0²,⁶]undecane (IV), as described in Japanese Patent Application Serial No. 77622/73, filed July 10, 1973 and the corresponding U.S. Pat. Application Serial No. 485,067 filed July 2, 1974, being filed concurrently herewith (Attorney's Reference Furuya Case 361) the entire contents of which are incorporated herein by reference,

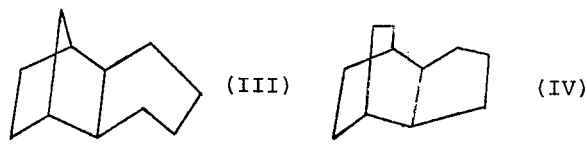

Various acid catalysts can be effectively used as the acid catalyst in the isomerization process of this invention for isomerizing tricyclo[5.3.1.0³,⁸]undecane to 1-methyladamantane. Examples of these acid catalysts are: Bronsted acids such as sulfuric acid, fluorosulfonic acid, chlorosulfonic acid, methanesulfonic acid, ethanesulfonic acid, trifluoromethanesulfonic acid, benzenesulfonic acid, and p-toluenesulfonic acid, and Lewis acids such as aluminum halides, preferably aluminum chloride and aluminum bromide, zinc halides, preferably zinc chloride and zinc bromide, boron halides, preferably boron trifluoride, and antimony halides, preferably antimony pentafluoride.

In case a Lewis acid is used as a catalyst, satisfactory results are obtained by employing a catalytic amount of that Lewis acid. Thus, the isomerization reaction proceeds very well employing 0.01 to 0.5 mole, preferably 0.05 to 0.2 mole, of a Lewis acid per mole of the starting tricyclo[5.3.1.0³,⁸]undecane (I). However, in order to complete the reaction in a short time period, it is preferred to use an equimolar or excess amount of the catalyst. Use of at least an equimolar amount of the catalyst is required, when a Bronsted acid is chosen as a catalyst, e.g., 0.5 to 100 moles of catalyst per mole of starting compound. It will be apparent to those skilled in the art that any appropriate combination of two or more kinds of catalysts, for instance, a boron trifluoride-sulfuric acid mixture, can also be used effectively.

It is sometimes preferred to carry out the isomerization reaction of the present invention in the presence of a solvent, especially when an excess of strong Lewis acid catalyst is employed to shorten the reaction time. Use of the solvent helps to achieve a good contact of the starting material (I), the melting point of which is 62°–63°C, with the catalyst, some of which are also solid at the reaction temperature, as well as to achieve the dissipation of heat which is evolved appreciably at the beginning of the reaction when a strong Lewis acid is used as the catalyst. The solvent employed is not critical, and any solvents unreactive towards the catalyst, such as aromatic hydrocarbons, aliphatic hydrocarbons, halogenated hydrocarbons and ethers can be used in this invention. Thus any solvent inert to the reaction can be used.

As the solvent, it is preferred to use halogenated lower hydrocarbons, preferably chlorinated or brominated hydrocarbons containing 1 to 6 carbon atoms such as methylene chloride, methylene bromide, chloroform, 1,2-dichloroethane, 1,2-dibromoethane, 1,2-dichloropropane, 1,3-dichloropropane, 1,3-dichlorobutane, 2-methyl-1,4-dichlorobutane, chlorocyclohexane and the like. The amount of solvent employed is from 0.1 to 500 times the weight of the starting material I.

Separation of the catalyst from the reaction product, namely 1-methyladamantane (II), can be accomplished most simply by extracting the resulting reaction mixture with an organic solvent. If a solvent is used for the isomerization reaction, the same solvent can also be used as the extraction solvent.

The reaction proceeds at a temperature in the range of from −30° to +180°C., but it is preferred to carry out the reaction at a temperature of 0° to 80°C.

According to the process of this invention, high purity 1-methyladamantane (II) can be obtained in a substantially quantitative yield without formation of significant amounts of undesirable polymeric or decomposition products.

This invention will now be further described by reference to the following illustrative Examples. A method for the synthesis of tricyclo[5.3.1.0³,⁸]undedane (I) used as the starting material is also described in the following illustrative Preparation.

Preparation

Synthesis of Tricyclo[5.3.1.0³,⁸]undecane:

A solution of 15 g (0.1 mole) of tricyclo[5.2.2.0²,⁶]undecane (IV) in 100 ml of methylene chloride was agitated at 0°C. Then, 1.3 g (0.01 mole) of anhydrous aluminum chloride was added to the solution, and the mixture was heated and refluxed under agitation for 1 hour. The reaction mixture was allowed to cool and then poured over 100 ml of ice water. The organic layer was separated and the aqueous layer was extracted with methylene chloride. The methylene chloride extract was combined with the organic layer, and the mixture was washed with a saturated aqueous solution of sodium hydrogencarbonate and then with water, and then dried over anhydrous sodium sulfate. Methylene chloride was distilled off, and the residue was subjected to fractionataion. The highest boiling point fraction (boiling at 111 to 112°C. under 36 mmHg) was separated, whereby 6.3 g (yield: 42 wt.%) of tricyclo[5.3.1.0³,⁸]undecane was obtained.

Melting Point:
62°– 63°C. (sealed tube)

Elemental Analysis:
Found: C, 87.8; H, 12.2%,
Calculated for $C_{11}H_{18}$: C, 87.92; H, 12.08%

IR Spectrum ($cm^{-1}$):
2925, 2890, 2870, 2850, 1480, 1465, 1450, 1340, 975, 895, 845

Mass Spectrum (m/e) (relative intensity):
150 ($M^+$, 100), 122 (39), 121 (39), 109 (12), 108 (16),
107 (19), 93 (27), 81 (27), 80 (46), 79 (40), 67 (35),
55 (18), 41 (40)

$^1H$ NMR Spectrum ($CDCl_3$ solvent) : $\delta 1.0 - 2.0$ ppm, complex multiplet $^{13}C$ NMR Spectrum (CDCl solvent, 15.1 MHz, TMS at 0 ppm) (ppm):
15.2, 24.8, 26.3, 27.1, 30.9, 31.9, 32.3, 33.1

In view of the fact that the melting point is relatively high (62°–63°C) though the product is a saturated hydrocarbon having 11 carbon atoms and both IR and $^1H$ NMR spectra are simple, it is considered from the data that the product has a highly symmetrical structure. Further, the fact that in the mass spectrum the parent peak is the base peak, is evidence that the product is a cage molecule. Eight kinds of carbon atoms are observed in the $^{13}C$ NMR spectrum, and therefore, the product can be considered to be tricyclo[5.3.1.0³,⁸]undecane (I) or tricyclo[4.4.1.0²,⁸]undecane of the following formula (V):

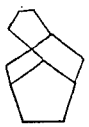

(V)

However, the compound (V) includes a 7-membered ring and has a great distortion. Therefore, it cannot be considered to be an intermediate that can be isolated in a stable condition.

In view of the foregoing, it is concluded that the isolated product is tricyclo[5.3.1.0³,⁸]undecane (I).

EXAMPLE 1

A solution of 15 g (0.1 mole) of tricyclo[5.3.1.0³,⁸]undecane (I) in 100 ml of methylene chloride was agitated at 0°C, and 2.0 g (0.015 mole) of anhydrous aluminum chloride was added to the solution. The mixture was heated and refluxed under agitation for 6 hours, and the resulting reaction mixture was allowed to cool and poured over 100 ml of ice water. The organic layer was separated, and the water layer was extracted with methylene chloride. The methylene chloride extract was combined with the organic layer, and the mixture was washed with a saturated aqueous solution of sodium hydrogencarbonate and then with water, and then dried over anhydrous sodium sulfate. Methylene chloride was distilled off the residue was sublimed to obtain 13.7 g (yield: 91 wt. percent) of 1-methyladamantane (II). All of the IR, NMR and MS spectra were in agreement with those of an authentic sample synthesized from tetramethylenenorbornane according to the method of Schleyer, et al. [Tetrahedron Letters, 305 (1961)].

EXAMPLE 2

A mixture of 7.5 g (0.05 mole) of tricyclo[5.3.1.0³,⁸]undecane (I) and 76 g (0.5 mole) of trifluoromethanesulfonic acid was heated at 80°C. for 30 hours under agitation. The reaction mixture was allowed to cool and then poured over 200 ml of ice water. The organic layer was separated and the water layer was extracted with methylene chloride. The methylene chloride extract was combined with the organic layer, and the mixture was washed with a saturated aqueous solution of sodium hydrogencarbonate and then with water, and dried over anhydrous sodium sulfate. Methylene chloride was distilled off and the residue was sublimed to obtain 6.8 g (yield: 90 wt. percent) of 1-methyladamantane (II). All of the IR, NMR and MS spectra of the product were in agreement with those of the authentic sample.

The preparation of the compound tricyclo[5.2.2.0²,⁶]undecane is described in Japan Patent Application No. 106514/72, corresponding to U.S. Pat. Application Ser. No. 404 195, filed Oct. 9, 1973, the entire contents of which are incorporated herein by reference.

The embodiments of the invention in which an exclusive property or privilege is claimed are defined as follows:

1. The process for preparing 1-methyladamantane, which comprises isomerizing tricyclo[5.3.1.0³,⁸]undecane in the presence of an acid catalyst.

2. The process according to claim 1 for preparing 1-methyladamantane which consists of causing tricyclo[5.3.1.0³,⁸]undecane to isomerize in the presence of an acid catalyst selected from the group consisting of a Lewis acid, a Bronsted acid, and mixtures thereof, at a temperature of from −30° to +180°C. until said tricyclo[5.3.1.0³,⁸]undecane is substantially completely transformed to 1-methyladamantane and recovering 1methyladamantane from the reaction mixture.

3. The process according to claim 2, in which tricyclo[5.3.1.0³,⁸]-undecane is dissolved in a solvent selected from the group consisting of methylene chloride, methylene bromide, chloroform, 1,2-dichloroethane, 1,2-dibromoethane, 1,2-dichloropropane, 1,3dichloropropane, 1,4-dichlorobutane, 2-methyl-1,4-dichlorobutane and chlorocyclohexane.

4. The method according to claim 2 wherein the reaction temperature is in the range of 0° to 80°C.

5. The method according to claim 2 wherein the acid catalyst is from 1 to 20 moles, per mole of tricyclo[5.3.1.0$^{3,8}$]undecane, of a Bronsted acid selected from the group consisting of sulfuric acid, fluorosulfonic acid, chlorosulfonic acid, methanesulfonic acid, trifluoromethanesulfonic acid, ethanesulfonic acid, benzene sulfonic acid and p-toluenesulfonic acid.

6. The method according to claim 2 wherein the acid catalyst is from 0.01 to 3 moles, per mole of tricyclo[5.3.1.0$^{3,8}$]undecane, of a Lewis acid selected from the group consisting of an aluminum halide, a boron halide and antimony tetrafluoride.

* * * * *